United States Patent [19]

Clark

[11] E Re. 29,180

[45] Reissued Apr. 12, 1977

[54] MOINEAU PUMP WITH ROTATING OUTER MEMBER

[76] Inventor: Wallace Clark, 1830 S. German Church Road, Indianapolis, Ind. 46239

[22] Filed: Apr. 2, 1976

[21] Appl. No.: 673,272

Related U.S. Patent Documents

Reissue of:

[64] Patent No.: 3,932,072
Issued: Jan. 13, 1976
Appl. No.: 504,354
Filed: Sept. 9, 1974

U.S. Applications:

[63] Continuation-in-part of Ser. No. 411,162, Oct. 30, 1973, abandoned.

[52] U.S. Cl. ..... 418/48; 418/161; 308/36.3; 308/63; 308/78

[51] Int. Cl.[2] ..... F01C 1/10; F04C 1/06; F16C 25/00; F16C 3/14

[58] Field of Search ..... 418/48, 161; 308/187.1, 308/36.3, 63, 78

[56] References Cited

UNITED STATES PATENTS

| | | | |
|---|---|---|---|
| 2,290,137 | 7/1942 | Aldridge | 418/48 |
| 3,479,960 | 11/1969 | Cardoso | 418/48 |
| 3,490,818 | 1/1970 | Bonner | 308/187.1 |
| 3,603,407 | 9/1971 | Clark | 418/48 |
| 3,637,273 | 1/1972 | Orndorff, Jr. | 308/DIG. 12 |

FOREIGN PATENTS OR APPLICATIONS

| | | | |
|---|---|---|---|
| 1,188,669 | 4/1970 | United Kingdom | 418/48 |

*Primary Examiner*—John J. Vrablik
*Attorney, Agent, or Firm*—Melville, Strasser, Foster & Hoffman

[57] ABSTRACT

A pump composed of a gear pair made up of an inner member having at least one external helical thread, and an outer member having internal helical threads, there being one more internal helical thread in the outer member than the number of threads on the inner member. The inner member is free to gyrate but prevented from rotation, and the outer member rotates on its true axis. The outer member is fixed in a tubular casing having at least one aperture for fluid being pumped, and this member extends beyond the gear pair and constitutes a drive shaft for the pump. The tubular casing is disposed in a housing and is arranged for rotation in the housing on suitable bearings and suitable seals. The housing has a port at each end of said gear pair, so that the direction of pumping may be reversed by reversing the direction of rotation of said drive shaft.

6 Claims, 5 Drawing Figures

MOINEAU PUMP WITH ROTATING OUTER MEMBER

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 411,162 filed Oct. 30, 1973, and now abandoned, entitled "Boat Propulsion Apparatus," in the name of the present inventor.

BRIEF SUMMARY OF THE INVENTION

Pumps made up of a helical gear pair have been known since their invention by R. J. L. Moineau, and are disclosed in Moineau U.S. Pats. No. 1,892,217 dated Dec. 27, 1932 and U.S. Pats. No. 2,483,370 dated Dec. 27, 1949, and others. Reference may be had to these patents for a basic understanding of such pumps, which are generally referred to as progressing cavity pumps.

Either member of the gear pair may rotate, and it is a characteristic of such pumps that one member must gyrate. Thus, the external member may be stationary while the internal member rotates and gyrates. The external member may be held against rotation and in this case when the internal member is rotated on its true axis, the external member will gyrate or wobble. Similarly, the external member may be rotated while the internal member is held against rotation. If the external member rotates on its true axis, the internal member must be permitted to gryrate. If the external member is permitted to gyrate, the internal member may be stationary.

Gear pairs as outlined above have been used as motors, as taught, for example, in Clark U.S. Pat. No. 3,603,407 dated Sept. 7, 1971.

Briefly, according to the present invention, a gear pair is provided, wherein the inner member is prevented from rotation but is permitted to gyrate, while the outer member rotates on its true axis. The outer member is fixed in a casing which extends beyond the gear pair and constitutes a drive shaft for the pump. The casing is mounted in suitable bearings with suitable seals in a housing. Ports are provided in the housing at each end of the gear pair, and the casing has one or more apertures for the passage of fluid being pumped. The direction of pumping is then determined by the direction of rotation of the drive shaft; and thus the pump may be made uni-directional in either direction, or it may be made reversible. Depending upon the use to be made of the pump, various bearing arrangements and various sealing arrangements may be used, which will be described in detail hereinafter.

DETAILED DESCRIPTION

Figures 1, 2, 3, 4:
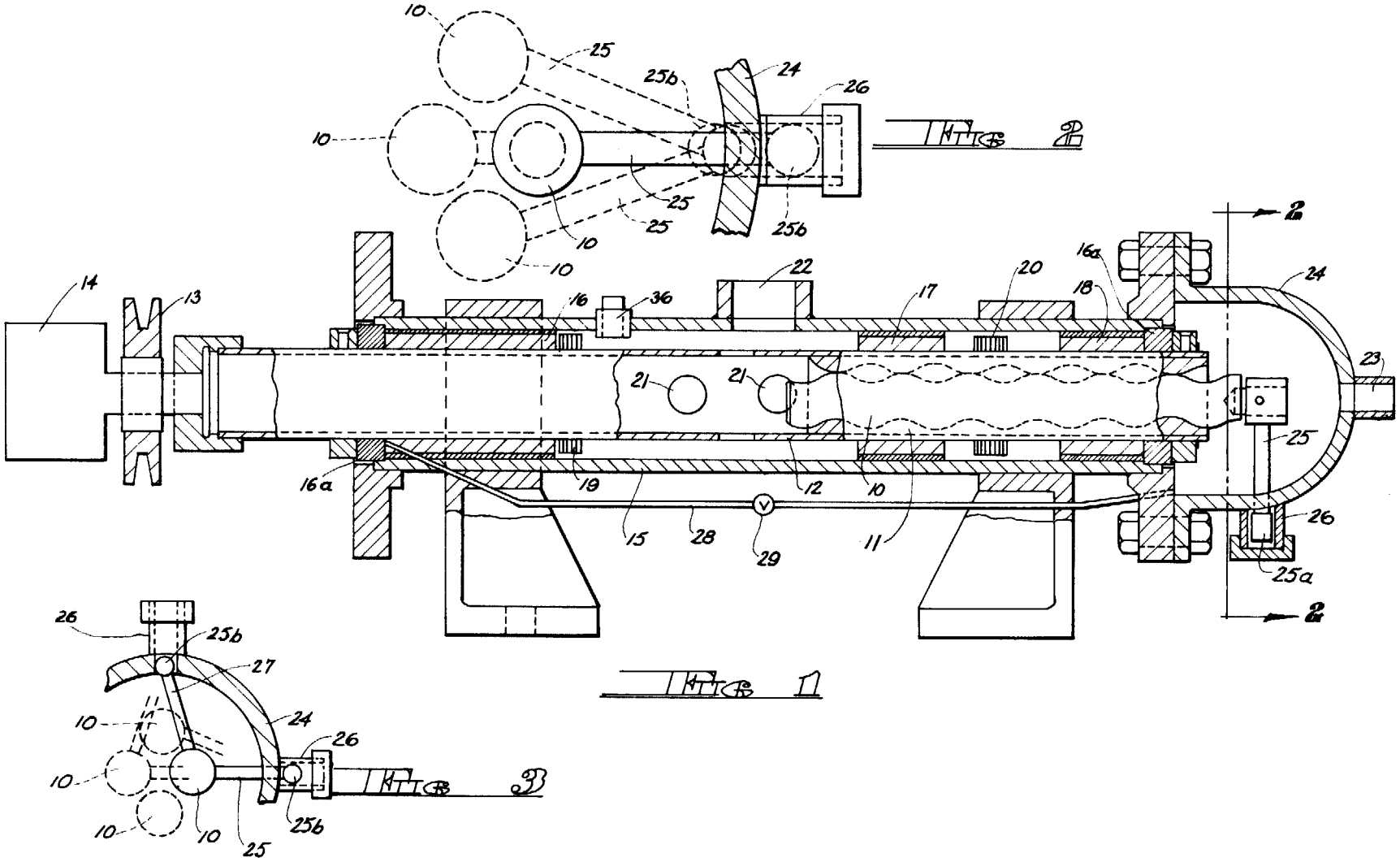
FIG. 1 is a cross sectional view of a pump according to the invention in one embodiment.
FIG. 2 is a diagrammatic representation of the means for preventing rotation of the inner member.
FIG. 3 is a view similar to FIG. 2 showing a modification of the means for preventing rotation of the inner member.
FIG. 4 is a fragmentary view similar to FIG. 1 showing a modification in the bearing structure.
Figure 4:
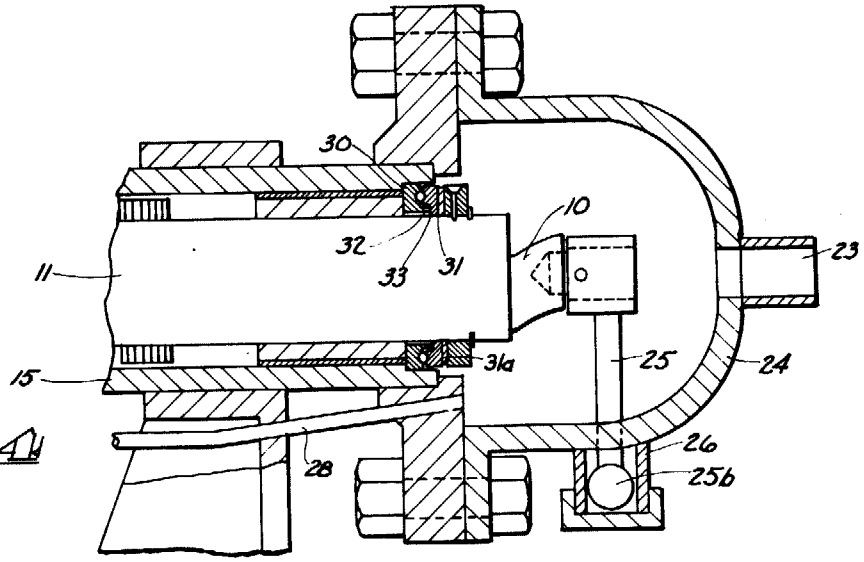

The pumping units comprise the inner member 10 and the outer member 11. The inner member may have one helical thread in which case the outer member will have two helical threads. The outer member 11 is fixed in a casing indicated at 12 which extends beyond the gear pair 10 and 11 and constitutes a drive shaft for the pump. The casing 12 may be rotated by means of a pulley 13 from a suitable source of power or by means of a prime mover directly coupled thereto as indicated at 14.

The drive shaft or casing 12 is mounted within a housing 15 by means of suitable bearings 16, 17, and 18, and suitable seals are provided at 19 and 20.

If the fluid pumped has no lubricity such as, for example, water, the bearings 16, 17 and 18 may be conventional marine type bearings known as "Cutless" bearings. In this case, the seals 19 and 20 may be floating seals which may comprise a plurality of washers of resilient material which can float up against the respective marine bearings 16 and 17 or 18, depending upon the direction of pumping.

The casing 12 is provided with one or more apertures 21 for the passage of fluid being pumped and ports are provided at 22 and 23.

The port 23 is provided in a dome-like element 24 suitably secured to the housing 15 and within the member 24 means are provided to prevent rotation of the inner member 10 of the pump while permitting gyration. Thus, there is fixed to the end of the inner element 10 a radial arm 25 which extends through the dome 24 into a cylinder 26. Clearance is provided between the members 25 and the cylinder 26 so that locking will not occur. The member 25 will reciprocate and oscillate a small amount as a result of the gyration of the member 10. By a suitable dimensional relationship between the cylinder 26 and the piston 25a on the end of the radial arm 25, a dashpot effect may be achieved which will dampen the vibration of the orbiting or gyrating inner element 10. FIG. 2 diagrammatically represents the relationship between the members 25, 25a, 26 and 10 during gyrational movement of the member 10. In FIG. 2 the piston 25a has been replaced by a ball 25b. Either embodiment operates successfully.

In the modification of FIG. 3, an additional radial arm 27 is provided substantially at right angles to the arm 25. It should be noted that while the arm 25 is non-rotatably secured to the end of the member 10, the arm 27 must be permitted a small amount of oscillatory movement. The arm 27 may terminate in a ball 25b operating in a second cylinder 26. The advantage of the construction of FIG. 3 is that the arm 27 and its associated parts provide a damping effect at right angles to the damping effect of the arm 25 and its associated parts. The result is substantially complete damping and a reduction of gyratory vibration to a minimum. In FIG. 1 it will be noted that a duct 28 is provided connecting the interior of the dome 24 with the remote end of the bearing 16. An adjustable valve is shown at 29. Where the member 10 is extremely long, it may be desirable to provide an additional arm like the arm 27, working in an additional cylinder 26, and disposed opposite the arm 25, to eliminate any cocking effect on the inner member.

It will be clear that in one direction of rotation of the drive shaft 12, the port 22 will be the intake port and port 23 will be the pressure port. In this condition, the duct 28 serves to provide pressure to the marine bearing 16 and thrust washer 16a. The fluid being pumped enters through the port 22 and then passes through the apertures 21 and thence through the cavities between the inner and outer members 10 and 11 of the pump and passes through the dome 24 and through the outlet port 23.

If the direction of rotation of the drive shaft 12 is reversed, the port 23 will become the intake port and the fluid will pass through the dome 24 and through the cavities between the members 10 and 11, and thence through the apertures 21 and out the port 22. In this case the duct 28 will conduct any leakage passing the seal 19 to the dome 24, which will be the intake end.

Thus, it will be clear that the pump shown in FIG. 1 is a reversible pump especially suitable for the pumping of fluids having no lubricity.

If the fluid being pumped has lubricity, it becomes possible to use ball bearings without marine bearings at the pressure end of the gear pair if the pump is a uni-directional pump, or at both ends by spring loading the bearing races at the suction end to keep the balls and races in contact, as indicated at 31a. If the pump is to be a two-directional or reversible pump and the fluid being pumped has lubricity, then ball bearings without marine bearings may be used at both ends, by spring loading the bearing races at both ends to keep the balls and races in contact when on suction.

In FIG. 4 there is shown a ball bearing comprising the races 30 and 31. It will be observed that the race 30 is provided with a projecting annular lip 32 arranged to cooperate with a counterbore 33 in the other race. If the direction of rotation of the element 11 is such that 23 is the exit port, then the end of the pump shown in FIG. 4 is the pressure end and pressure fluid has access to the ball bearing. There is thus achieved a partially hydrostatic bearing and the lip 32 and counterbore 33 provide a rotating seal. The lip 32 will be slightly softer than the bottom of the counterbore 33 so that as wear takes place, the seal will be maintained. When pumping fluids which adequately lubricate the balls, the seal 20 and bearings 17 and 18 may be omitted.

If the pump of FIG. 4 is to be a uni-directional pump the bearing and seal at the other end of the pump may be as in FIG. 1 and of course if the direction of pumping is to be reversed and the pump will be uni-directional, it will be clear that the bearing structure 30–33 will be at the pressure end and the marine bearing at the suction end, and again, radial bearings and floating seal can be omitted on the pressure end if sufficient lubricity is present in the fluid.

Figure 5:
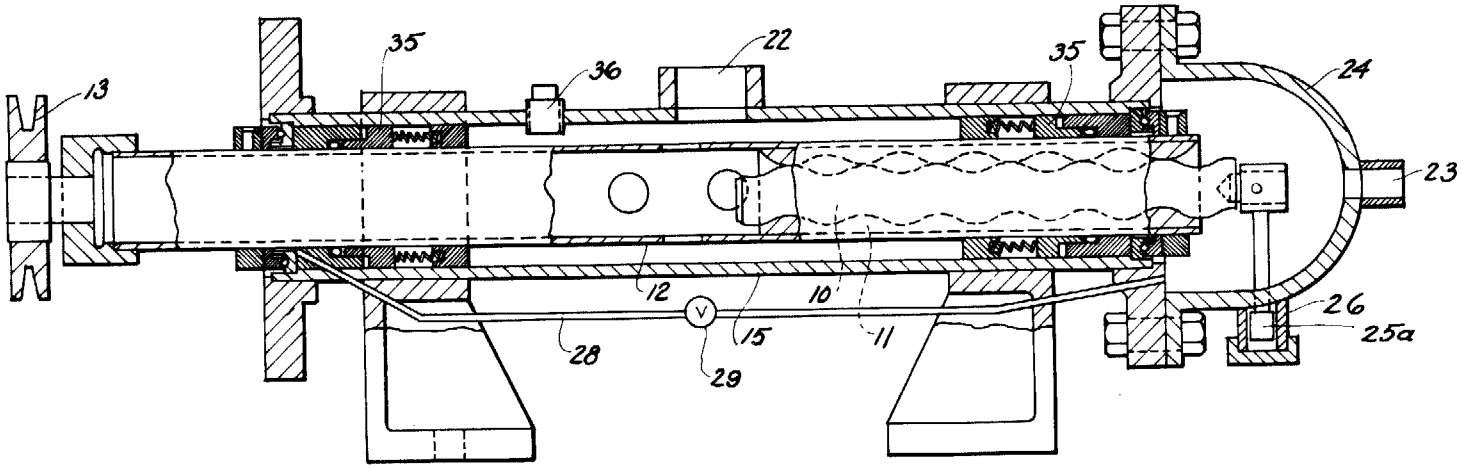
FIG. 5 is a view similar to FIG. 1 showing a modified seal structure.

In the event the pump is to be a reversible or two-directional pump, and the fluid being pumped has some lubricity, the structure may be as shown in FIG. 5. In this event, the bearings at both ends may be ball bearings as just described in connection with FIG. 4, or with conventional races without sealing lips. Also in this case, conventional mechanical seals, as indicated at 35, may be substituted for other types of seals. Mechanical seals are old and well known and it is not necessary to describe the details of their construction. Of course one end could be so treated, with some other treatment on the other end, for uni-directional pumping. However, as described above, ball races on the suction ends should be spring loaded when no other radial bearing is employed.

A clean-out or inspection plug may be provided as at 36 and in the embodiment of FIG. 1 this plug may extend far enough within the housing 15 to serve as a stop for the floating seal 19.

The invention described herein presents advantages over the conventional progressing cavity pump, in that it eliminates the need for universal joints and the connecting rod, and thus the attendant difficulties of lubricating them. Furthermore, the fact that lubrication is ordinarily unnecessary makes it possible to avoid contamination of the fluids being pumped, with the lubricant. This is of importance where foods or drugs are being pumped.

It will be clear to those skilled in the art that the devices described above may function as motors, if a fluid is pumped therethrough.

It is believed that the pump has been fully described herein and it will be clear that various modifications may be made without departing from the spirit of the invention. It should be understood therefore that no limitations not expressed in the claims are intended and no such limitations should be implied.

The embodiments of the invention in which an exclusive property or privilege is claimed are defined as follows:

1. A pump constituted of a gear pair made up of an inner member having at least one external helical thread, and an outer member having internal helical threads, there being one more internal helical thread in the outer member than the number of external helical threads on the inner member, a radial arm non-rotatably secured at one of its ends to said inner member, and fixed means limiting the other end of said radial arm to reciprocatory and oscillatory motion, said outer member being free to rotate on its true axis, said outer member being fixed in a tubular casing extending beyond said inner and outer members and constituting a drive shaft, said casing having at least one aperture for the passage of fluid being pumped, and being disposed within a housing, said casing being supported for rotation within said housing in bearings, said housing having a port at each end of said gear pair, whereby the direction of pumping may be reversed by reversing the direction of rotation of said drive shaft.

2. A pump according to claim 1 wherein an additional radial arm is secured at one of its ends to said inner member substantially at right angles to said first mentioned radial arm for limited oscillatory movement with respect to said first arm, and fixed means for the other end of said additional radial arm limiting said other end to oscillatory and reciprocatory movement.

3. A pump according to claim 1, wherein the fluid being pumped does not have lubricity, and said bearings are marine type bearings provided with floating seals, and wherein there is a duct connecting the pressure side of said gear pair with the marine bearing on the suction side of said gear pair, said duct including an adjustable valve.

4. A uni-directional pump according to claim 1, wherein the fluid being pumped has lubricity, and wherein one of said bearings is on the pressure side of the gear pair and the other of said bearings is on the suction side of said gear pair, and wherein the bearing on said pressure side is a ball bearing including a mechanical seal, and the bearing on said suction side is a marine type bearing provided with a floating seal, and wherein there is a duct connecting the pressure side of said gear pair with the marine bearing on the suction side of said gear pair, said duct including an adjustable valve.

*5. An apparatus comprising a gear pair made up of an inner member having at least one external helical thread, and an outer member having internal helical threads, there being one more internal helical thread in the outer member than the number of external helical threads on the inner member, whereby rotation of one of said members with respect to the other involves gyration of one of said members;*

*(a) a radial arm secured at one of its ends to said inner member and having a piston element at its other end,*

*(b) a radial cylinder fixed with respect to one of said members and cooperating with said piston, said radial arm, piston and cylinder limiting the relative motion of said inner member with respect to said outer member to gyratory motion.*

*6. An apparatus comprising a gear pair made up of an inner member having at least one external helical thread, and an outer member having internal helical threads, there being one more internal helical thread in the outer member than the number of external helical threads on the inner member, a radial arm non-rotatably secured at one of its ends to said inner member, said radial arm having a piston element on its other end, means for limiting said inner member to reciprocatory and oscillatory motion relative to said outer member, said limiting means including a radially inwardly opening cylinder receiving said piston element for oscillation and reciprocation, and means for connecting said outer member and said limiting means for relative rotation.*

* * * * *